United States Patent Office 2,781,398
Patented Feb. 12, 1957

2,781,398

PHENYL CYCLOHEXYL BIS DIETHYL-AMINOETHANES

Henri Morren, Forest-Brussels, Belgium, assignor to Union Chimique Belge, S. A., Brussels, Belgium, a corporation of Belgium No Drawing. Application November 3, 1955,
Serial No. 544,810

Claims priority, application Belgium November 18, 1954

5 Claims. (Cl. 260—570.5)

The invention relates to diethylamine products, derivatives of 1,3-bis-(dialkylamino)-propane.

It has for object antispasmodics having a low toxicity but a considerable spasmolytic action.

The products according to the invention are especially distinguished from antispasmodics at present known by the extent of their musculotropic effect. Compared with papaverine, for example, they have a spasmolytic musculotropic activity 25 times greater whilst having the same toxicity. Clinical tests have shown their remarkable efficiency in the treatment of hepatic and nephritic colics. Moreover their anesthetic power is equal to 1.5 times that of novocaine.

However, the administration of the new products does not present any difficulty. These products can be incorporated buccally or applied in the form of injections. As to the dosage it varies essentially according to the age of the patient and the malady treated; doctors determine it in the different cases.

The products according to the invention are constituted by two dichlorhydrate isomers: the dihydrochloride of 1-phenyl-1-cyclohexyl-2,2-bis-(diethylaminoethyl)-ethane:

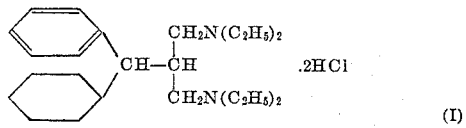
(I)

and the dihydrochloride of 1-phenyl-1-cyclohexyl-3,4-bis-(diethylamino)-butane:

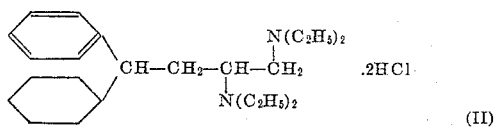
(II)

The process of preparation consists in reacting 1-chloro-2,3-bis-(diethylamino)-propane with the sodium derivative of phenyl-cyclohexylacetonitrile. 2-phenyl-2-cyclohexyl-4,5-bis-(diethylamino)-pentanenitrile is obtained.

The decyanidation of this compound is effected, for example, by means of an alkaline amide by the method of Bockmeuhl and Ehrhardt, Liebigs Ann. Chem. 561 (1948), 52–65. After elimination of the excess of amidine, the product is then converted into its dihydrochloride in known manner.

It is possible, according to requirement, to obtain the mixture of the two isomers I and II or to recover these two compounds separately, both the said compounds having the same biological activity and the same toxicity. They may be characterized by studying their infra-red spectra. They are also distinguished by their hygroscopicity, the dihydrochloride II having low hygroscopicity.

*Example 1*

40 g. of phenylcyclohexylacetonitrile are added at about 30° C. and with good stirring to a suspension of 7.8 g. of sodamide in 100 ml. of dry toluene. The mixture is heated on a water bath until the evolution of ammonia ceases. After cooling, a toluenic solution of 44 g. of 1-chloro-2,3-bis-(diethylamino)-propane is added to the suspension. This compound, the boiling point of which is 115–117° C./15 mm. Hg may be prepared by the method of W. H. Yanko et al. (J. Am. Chem. Soc. 67 (1945),664–68).

The mixture is heated under reflux for one hour, and then washed with cold water. The toluenic solution is extracted by means of dilute hydrochloric acid. The acid solution is made alkaline by means of potassium carbonate and is extracted with benzene.

The extraction liquid is concentrated and the residue is distilled off under a high vacuum. The 2-phenyl-2-cyclohexyl-4,5-bis-(diethylamino)-pentanenitrile boils at about 160–165° C. under a fraction of a millimetre of mercury.

To this product is added a suspension of 24 g. of sodamide in 200 ml. of dry xylene and the mixture is heated under reflux for about 20 hours.

The product is cooled and water is added under a current of nitrogen to destroy the excess of sodamide. The product is washed several times with water, the solvent is driven off in vacuo and the residue is distilled under a high vacuum. The product obtained has a boiling point of 147–149° C./0.2 mm. Hg.

The product is dissolved in methylethylketone and a stream of dry hydrochloric acid passed therethrough. The mixture is then allowed to stand for twelve hours. 55% of dihydrochloride melting at 205° C. (instantaneous melting point) are recovered. This is the product II of low hygroscopicity.

To the mother liquors obtained in the preceding operation is added a large excess of dry ether. Very hygroscopic microcrystals I are precipitated, which have a melting point below 70° C. which is difficult to determine.

*Example 2*

The procedure of Example 1 is followed until the treatment with the stream of dry hydrochloric acid. The hydrochloric acid solution is poured into a large volume of dry ether. A mixture of the two dihydrochlorides I and II is recovered.

I claim:

1. A composition of matter having spasmolytic action and low toxicity selected from the group consisting of the dihydrochloride of 1-phenyl-1-cyclohexyl-2,2-bis-(diethylamino-methyl)-ethane, and its isomer the dihydrochloride of 1-phenyl-1-cyclohexyl-3,4-bis-(diethylamino)-butane, and mixtures thereof.

2. A composition of matter having spasmolytic action and low toxicity, having the formula

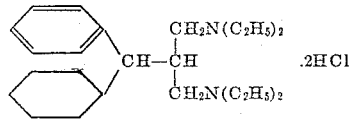

3. A composition of matter having spasmolytic action and low toxicity, having the formula

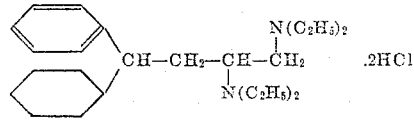

4. A process for the preparation of the composition of matter as claimed in claim 1, comprising the steps of reacting 1-chloro-2,3-(diethylamino)-propane with the sodium derivative of phenylcyclohexyl-acetonitrile, extracting the alkalinized reaction product by means of benzene, recovering 2-phenyl-2-cyclohexyl-4,5-bis-(diethylamino)-pentanenitrile by distillation, heating said 2- phenyl - 2 - cyclohexyl - 4,5 - bis-(diethylamino)-pentanenitrile with sodamide, cooling the reaction mixture, adding water to remove the excess of said sodamide, recovering the reaction product by distillation, dissolving said reaction product in an organic solvent, treating the solution so obtained with dry hydrochloric acid, crystallizing the dihydrochloride of 1-phenyl-1-cyclohexyl-3,4-bis-(diethylamino)-butane, adding to the mother liquors of the said crystallization an excess of ether and recovering dihydrochloride of 1-phenyl-1-cyclohexyl-2,2-bis-(diethylaminoethyl)-ethane.

5. A process for the preparation of the composition of matter as claimed in claim 1, comprising the steps of reacting 1-chloro-2,3-(diethylamino)-propane with the sodium derivative of phenylcyclohexyl-acetonitrile, extracting the alkalinized reaction product by means of benzene, recovering 2-phenyl-2-cyclohexyl - 4,5 - bis-(diethylamino)-pentanenitrile by distillation, heating said 2-phenyl-2-cyclohexyl-4,5-bis - (diethylamino) - pentanenitrile with sodamide, cooling the reaction mixture, adding water to remove the excess of said sodamide, recovering the reaction product by distillation, dissolving said reaction product in an organic solvent, treating the solution so obtained with dry hydrochloric acid, pouring said hydrochloric acid solution into a large volume of dry ether and recovering a mixture of the dihydrochloride of 1-phenyl-1-cyclohexyl-3,4-bis-(diethylamino) - butane and of the dihydrochloride of 1-phenyl-1-cyclohexyl-2,2-bis-(diethylaminomethyl)-ethane.

References Cited in the file of this patent

JACS 75, 292–94 (1953).